(12) United States Patent
Grichnik

(10) Patent No.: US 7,638,895 B2
(45) Date of Patent: Dec. 29, 2009

(54) MODULAR FLUID-ENERGY SYSTEM

(75) Inventor: Heather A. H. Grichnik, Peoria, IL (US)

(73) Assignee: Smartenergy, Ltd., Peoria, IL (US)

( * ) Notice: Subject to any disclaimer, the term of this patent is extended or adjusted under 35 U.S.C. 154(b) by 300 days.

(21) Appl. No.: 11/778,500

(22) Filed: Jul. 16, 2007

(65) Prior Publication Data

US 2009/0021018 A1 Jan. 22, 2009

(51) Int. Cl.
*F03D 5/04* (2006.01)
(52) U.S. Cl. .......................................... 290/55; 290/44
(58) Field of Classification Search ................... 290/43, 290/44, 54, 55; 416/3, 147
See application file for complete search history.

(56) References Cited

U.S. PATENT DOCUMENTS

| | | | |
|---|---|---|---|
| 698,409 A | 4/1902 | Neuser | |
| 1,300,499 A | 4/1919 | Slagel | |
| 1,352,960 A | 9/1920 | Heyroth | |
| 3,986,786 A | 10/1976 | Sellman | |
| 4,204,795 A | 5/1980 | Forrest | |
| 4,242,628 A | 12/1980 | Mohan et al. | |
| 4,289,970 A * | 9/1981 | Deibert | 290/44 |
| 4,315,713 A | 2/1982 | Verplanke | |
| 4,520,273 A * | 5/1985 | Rowe | 290/54 |
| 4,715,776 A | 12/1987 | Benesh | |
| 4,720,640 A | 1/1988 | Anderson et al. | |
| 4,838,757 A | 6/1989 | Benesh | |
| 5,495,128 A | 2/1996 | Brammeier | |
| 5,705,902 A | 1/1998 | Merritt et al. | |
| 5,967,749 A * | 10/1999 | Eaves et al. | 416/3 |
| 6,064,123 A * | 5/2000 | Gislason | 290/55 |
| 6,481,957 B1 | 11/2002 | Brill | |
| 6,664,655 B2 * | 12/2003 | Vann | 290/55 |
| 6,906,446 B2 | 6/2005 | Post | |
| 6,914,351 B2 | 7/2005 | Chertok | |
| 6,981,839 B2 | 1/2006 | Fan | |
| 7,132,760 B2 * | 11/2006 | Becker | 290/55 |
| 7,215,038 B2 * | 5/2007 | Bacon | 290/55 |
| 7,417,334 B2 * | 8/2008 | Uchiyama | 290/55 |
| 7,425,772 B2 * | 9/2008 | Novo Vidal | 290/52 |

(Continued)

FOREIGN PATENT DOCUMENTS

WO 2009/012261 A1 1/2009

OTHER PUBLICATIONS

Zhu, J.G., "Affordable Energy Comes Blowing In The Wind", University of Technology Sydney, www.eng.uts.edu.au/newsandevents/news/wind.htm, Jul. 2007.

(Continued)

*Primary Examiner*—Nicholas Ponomarenko
(74) *Attorney, Agent, or Firm*—H. Frederick Rusche; Husch Blackwell Sanders LLP

(57) ABSTRACT

A modular fluid-driven power generation system includes a frame; a rotor structure having an axis of rotation; the rotor structure including a plurality of blades, with each blade having a radial edge parallel to the axis of rotation and first and second axial ends perpendicular to said axis of rotation and wherein the radial edges of the blades define a path of rotation when the blades rotate; at least one magnet integral with at least one of the aerodynamic blades; and a first armature coil adjacent to the path of rotation.

22 Claims, 12 Drawing Sheets

U.S. PATENT DOCUMENTS 7,582,982 B1 * 9/2009 Deal .......................... 290/55

OTHER PUBLICATIONS

Pelonis, www.pelonis.com/oem.htm, Jul. 2007.

Part 1-Early History Through 1875, Illustrated History of Wind Power Development, www.telosnet.com/wind/early/html, Jun. 2007.

Search Report and Written Opinion, PCT/US2008/070078 (Sep. 25, 2008).

* cited by examiner

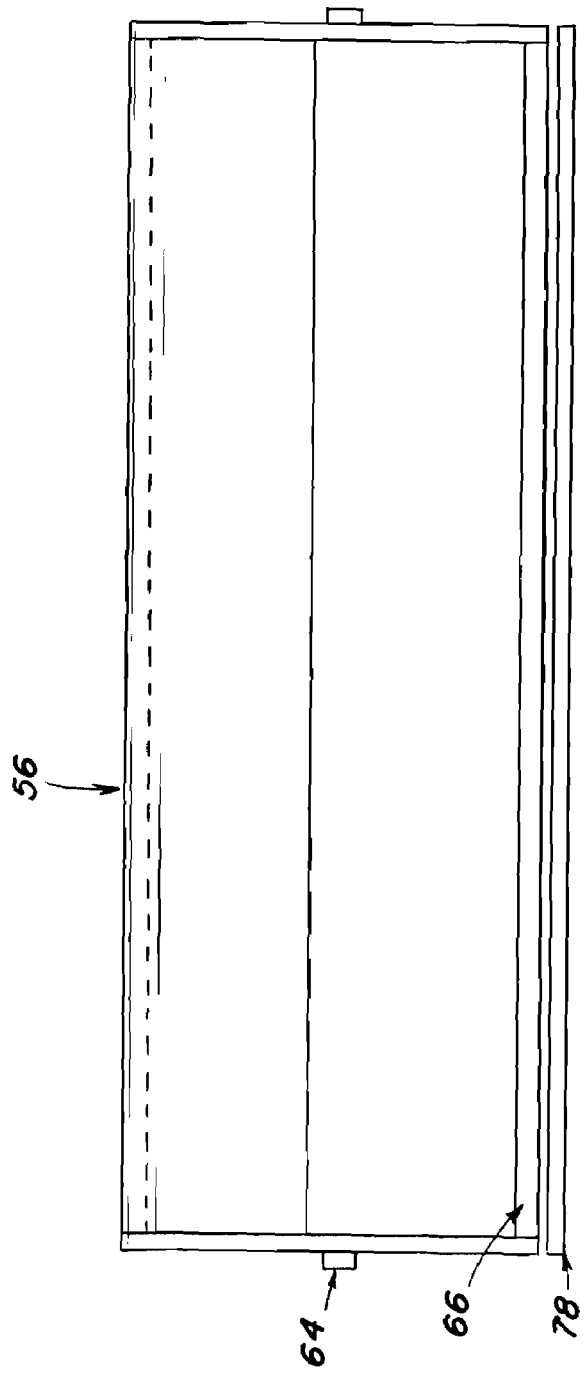
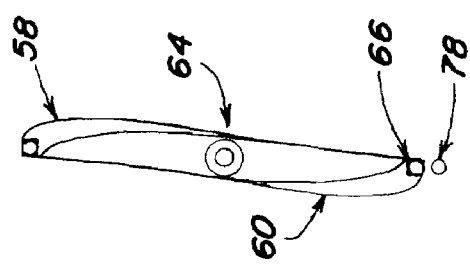

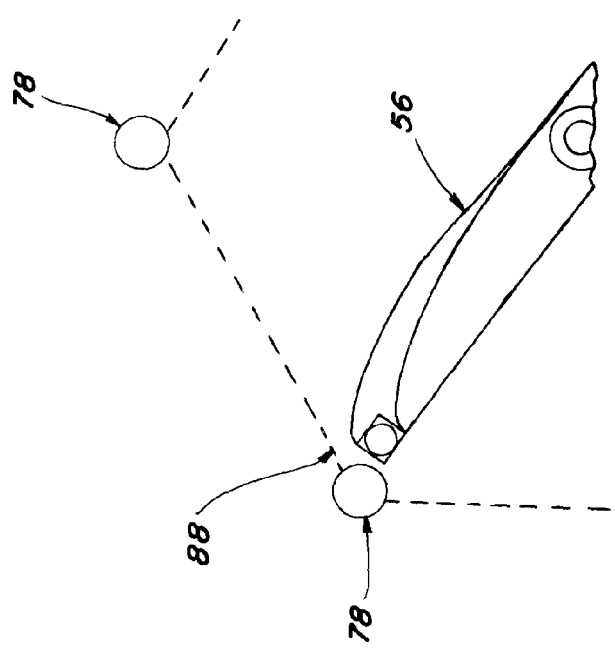

MODULAR FLUID-ENERGY SYSTEM

CROSS REFERENCES

None.

TECHNICAL FIELD OF THE INVENTION

The present invention relates generally to the field of fluid-driven power generation and, more particularly, to an improved fluid-driven power generation system.

BACKGROUND OF THE INVENTION

Small windpower systems are identified as systems intended to produce clean wind-based energy on a limited basis for single or low numbers of closely situated buildings or electrically operated devices. A schematic of a typical prior art small windpower system 10 is illustrated in FIG. 1. The prior art system includes a wind turbine 12 pivotably mounted on top of a pole. The pivoting connection allows the turbine to turn and orient itself relative to the actual wind direction. The wind turbine is mechanically connected to a generator (not shown) that incorporates a rotor structure, which is powered by the transmission of mechanical energy from the turbine, and a stator structure that generate electrical current through the use of magnets and armature coils in a known manner.

As current is generated, it passes to a charge regulator 14. The charge regulator is necessary to regulate the current, voltage, and frequency, all of which vary due, in part, to the inconsistent rotational speed of the wind turbine. Regulation is necessary to make the energy generated by the system compatible with public utilities and modern electronic devices. From the charge regulator, energy is passed to a battery or bank of batteries 16 for storage. Because the current generated by the system is DC, an inverter 18 must be used to convert the current to AC for common use before it passes to an electrically powered device 20.

While these prior art systems do provide clean energy, they suffer from a number of significant drawbacks. First, the typical propeller-type turbines used require "clean air" for efficient operation. Turbulent air greatly reduces the performance of these turbines. In order to maximize the "clean air" available to the turbine, these systems are typically installed at least 25 feet above any surrounding object and preferably with no objects within 500 feet in any direction. Thus, the practical footprint required for these systems is actually fairly large, making them impractical for urban areas for at least this reason. Further, the typical wind speed required to produce the necessary lift along the turbine blades for start up of these turbines is approximately 8 mph. Also, the blades are prone to failure in winds of speeds as low as 28 mph. Failure of the turbine blades can create substantial property damage and potential personal injury, which is yet another reason that these systems are not suitable for urban applications. Additionally, these turbines create significant amounts of noise, due to the pulsing of air as the blades pass in front of the required post or tower structure and "white noise" from the tip vortices at the ends of the blades, and have a very significant visual profile.

The prior art systems also require multiple mechanical connections to transfer the rotational energy of the turbine to the generator rotor, resulting in significant inefficiencies. In some cases, these systems suffer as much as a 30% loss of potential energy between the turbine and the generator. Furthermore, the multiple electrical components required to condition the generated energy also contribute to losses in the system in the form of heat. In some systems, these inefficiencies result in an additional loss of up to 30% of potential energy.

Therefore, it would be desirable to provide a more efficient wind or fluid-driven energy generation system that required fewer components and a lower start-up wind speed and was suitable for use in urban applications due to reduced noise and visual impact.

The present invention is directed to meeting one or more of the above-stated desirable objectives.

SUMMARY OF THE INVENTION

One aspect of the present invention is to provide a more efficient fluid-driven power generation system.

Another aspect of the invention is to provide an improved fluid-driven power generation system having significantly reduced noise and visual impact characteristics.

Yet another aspect of the invention is to provide an improved fluid-driven power generation system requiring significantly lower start-up wind speeds.

In accordance with the above aspects of the invention, there is provided a modular fluid-driven power generation system that includes a frame; a rotor structure having an axis of rotation; the rotor structure including a plurality of aerodynamic blades, with each blade having a radial edge parallel to the axis of rotation and first and second axial ends perpendicular to said axis of rotation and wherein the radial edges of the blades define a path of rotation when the blades rotate; at least one magnet integral with at least one of the aerodynamic blades; and a first armature coil adjacent to the path of rotation.

In another embodiment, there is provided a fluid-driven power generation system that includes a frame; a Savonius type rotor rotatably mounted on the frame and comprising a pair of blades disposed for symmetrical rotation about a horizontal axis, each of the blades having a radial edge parallel to the axis of rotation and first and second axial ends perpendicular to the axis of rotation, and wherein the radial edge of the blades define a generally circular path of rotation when the rotor is in motion; at least one magnet integral with at least one of the blades; a first armature coil connected to the frame and arranged at a point adjacent to the path of rotation; and a self-regulating heating element in electrical communication with said armature coil.

These aspects are merely illustrative of the various aspects associated with the present invention and should not be deemed as limiting in any manner. These and other objects, aspects, features and advantages of the present invention will become apparent from the following detailed description when taken in conjunction with the referenced drawings.

BRIEF DESCRIPTION OF THE DRAWINGS

Reference is now made to the drawings which illustrate the best known mode of carrying out the invention and wherein the same reference numerals indicate the same or similar parts throughout the several views.

FIG. 7A is front view of a rotor and armature coil combination for use in a fluid-driven power generation system according to another embodiment.

FIG. 7B is side view of a rotor and armature coil combination for use in a fluid-driven power generation system according to another embodiment.

FIG. 12 is an enlarged partial illustration of a Savonius type rotor suitable for use in multiple embodiments.

DETAILED DESCRIPTION

Figure 1:
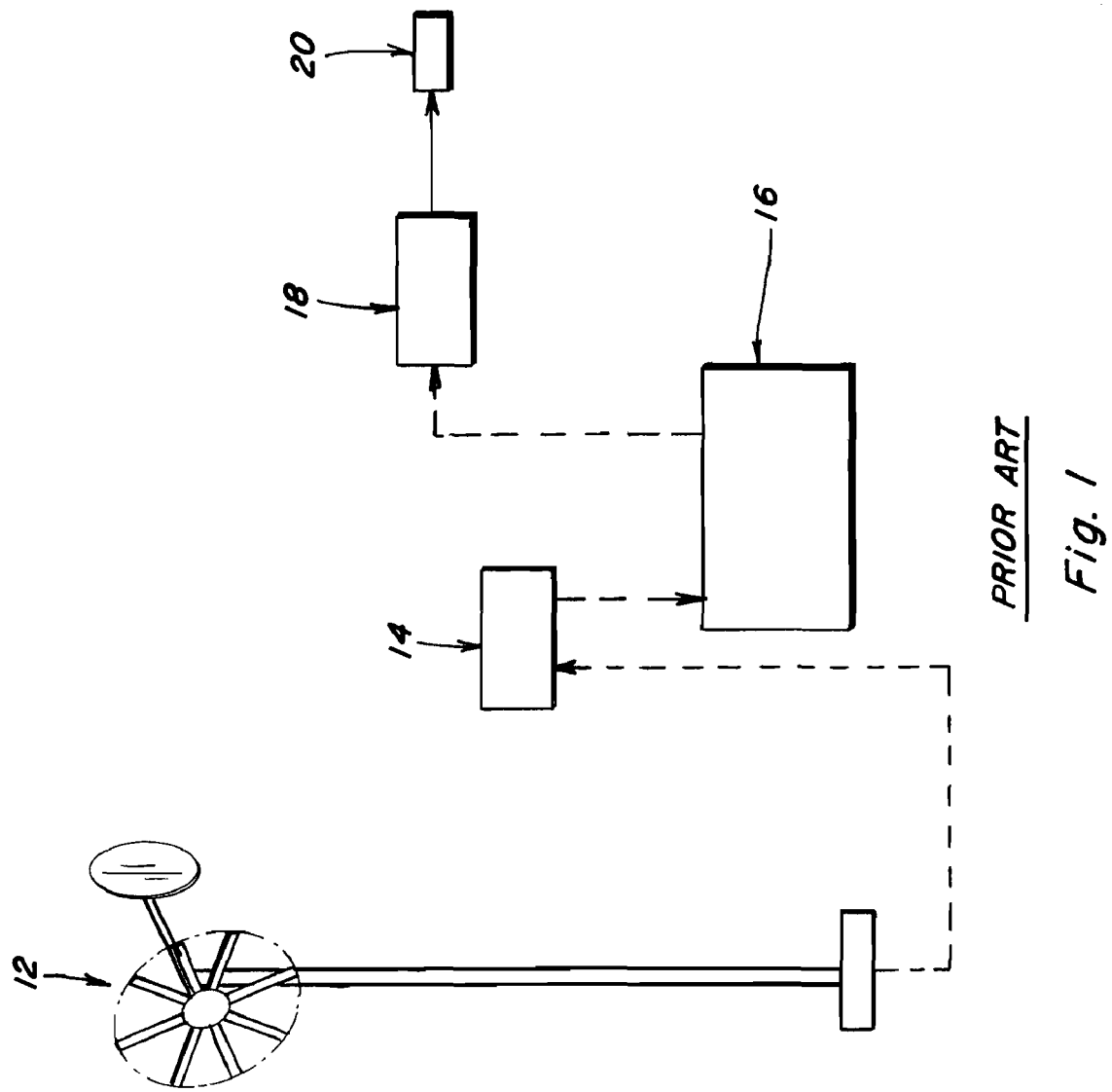
FIG. 1 is schematic illustration of a prior art wind-powered generation system.
Figure 2:
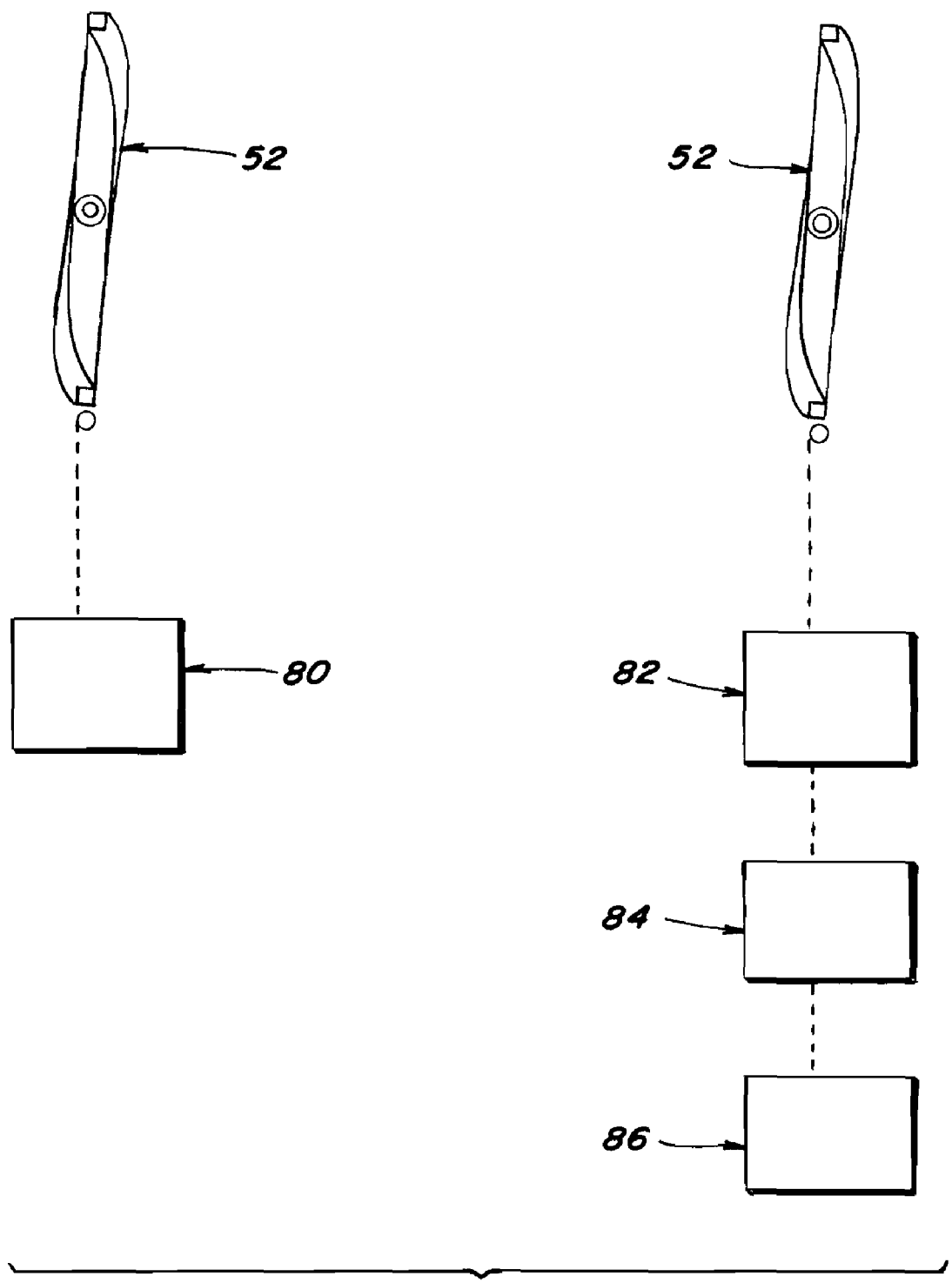
FIG. 2 is a schematic illustration of a modular fluid-driven power generation system according to one embodiment of the present invention.

In the following detailed description, numerous specific details are set forth in order to provide a thorough understanding of the invention. However, it will be understood by those skilled in the art that the present invention may be practiced without these specific details. For example, well-known methods, procedures, and components have not been described in detail so as not to obscure the present invention.

An embodiment of the present system 50 includes a rotor/generator assembly 52. Within the assembly, a frame or supporting structure 54 supports a rotor/generator 56. The rotor/generator is an aero-hybrid Savonius type rotor. Savonius type rotors have not previously been used in these applications. The frame 54 is arranged to support the rotor 56 as it rotates about its axis of rotation. The frame 54 and rotor 56 can be arranged so that the axis of rotation of the rotor is vertical or horizontal. Each of these orientations is capable of providing benefits for the system. A vertical orientation positions the rotor 56 to operate regardless of wind direction. This vertically oriented embodiment does require a significantly larger lower bearing in order to support the weight of the rotor as well as torque introduced by wind impacting the rotor.

Figure 3:
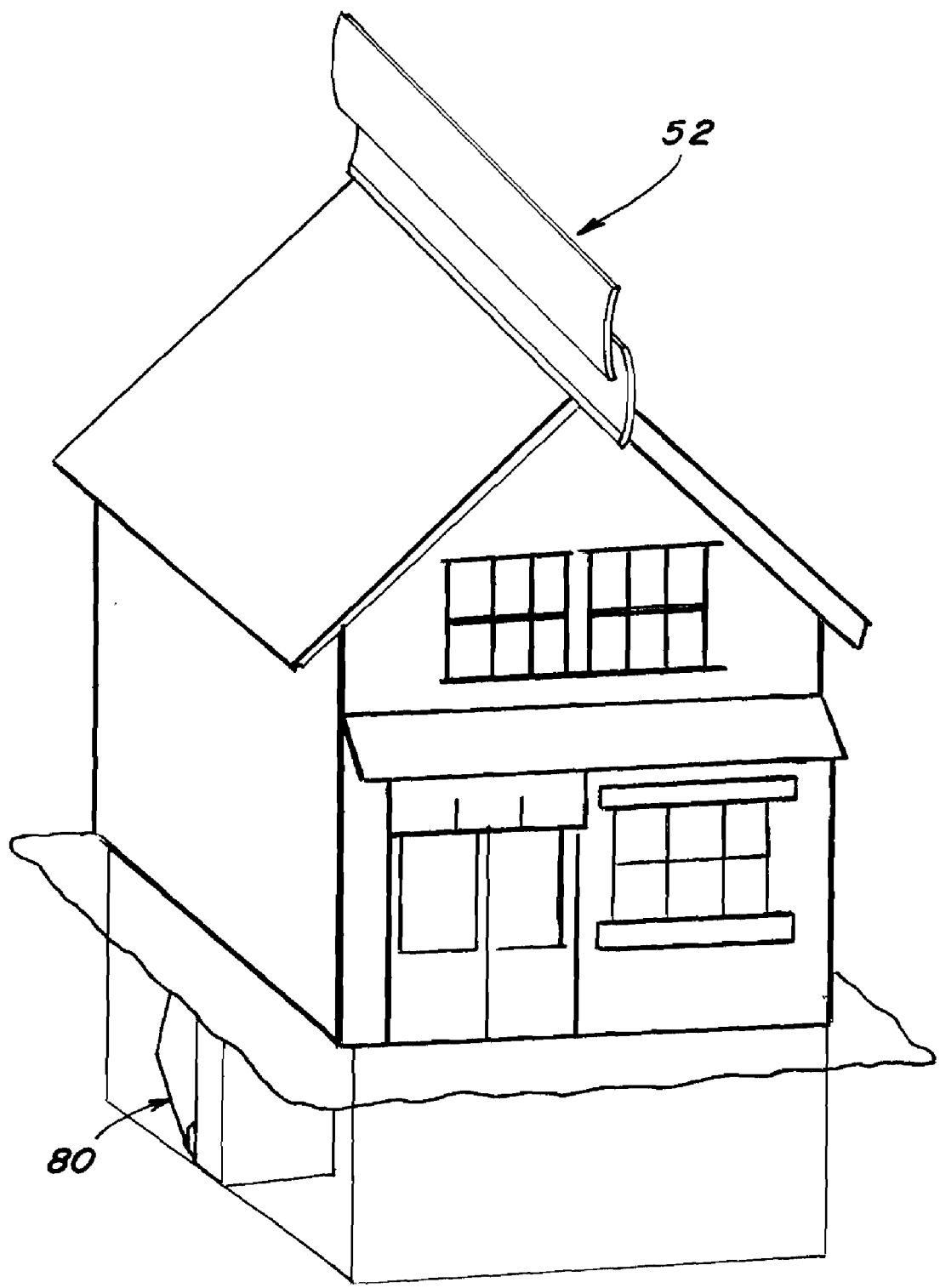
FIG. 3 is a schematic illustration of a modular fluid-driven power generation system according to another embodiment incorporated into a building structure.

Alternately, the horizontal embodiment eliminates this bearing issue and is particularly advantageous for residential applications in urban areas. In a preferred embodiment, a rotor/generator assembly 52 is incorporated into the roof line of a structure, as illustrated in exaggerated form in FIG. 3. This mounting arrangement provides a very low profile visual appearance (to the point of being unnoticeable from the ground). Furthermore, when the rotor/generator assembly 52 is mounted horizontally along the peak of a pitched roof, the boundary layer effect along the roof leading to the assembly creates enhanced flow characteristics and increases the efficiency of operation of the rotor/generator assembly 52. If such a roof mounted arrangement is not available in a particular application, or if the prevailing winds are not agreeably aligned with the prevailing wind direction, a vertical mounting orientation is preferable.

Figure 10:
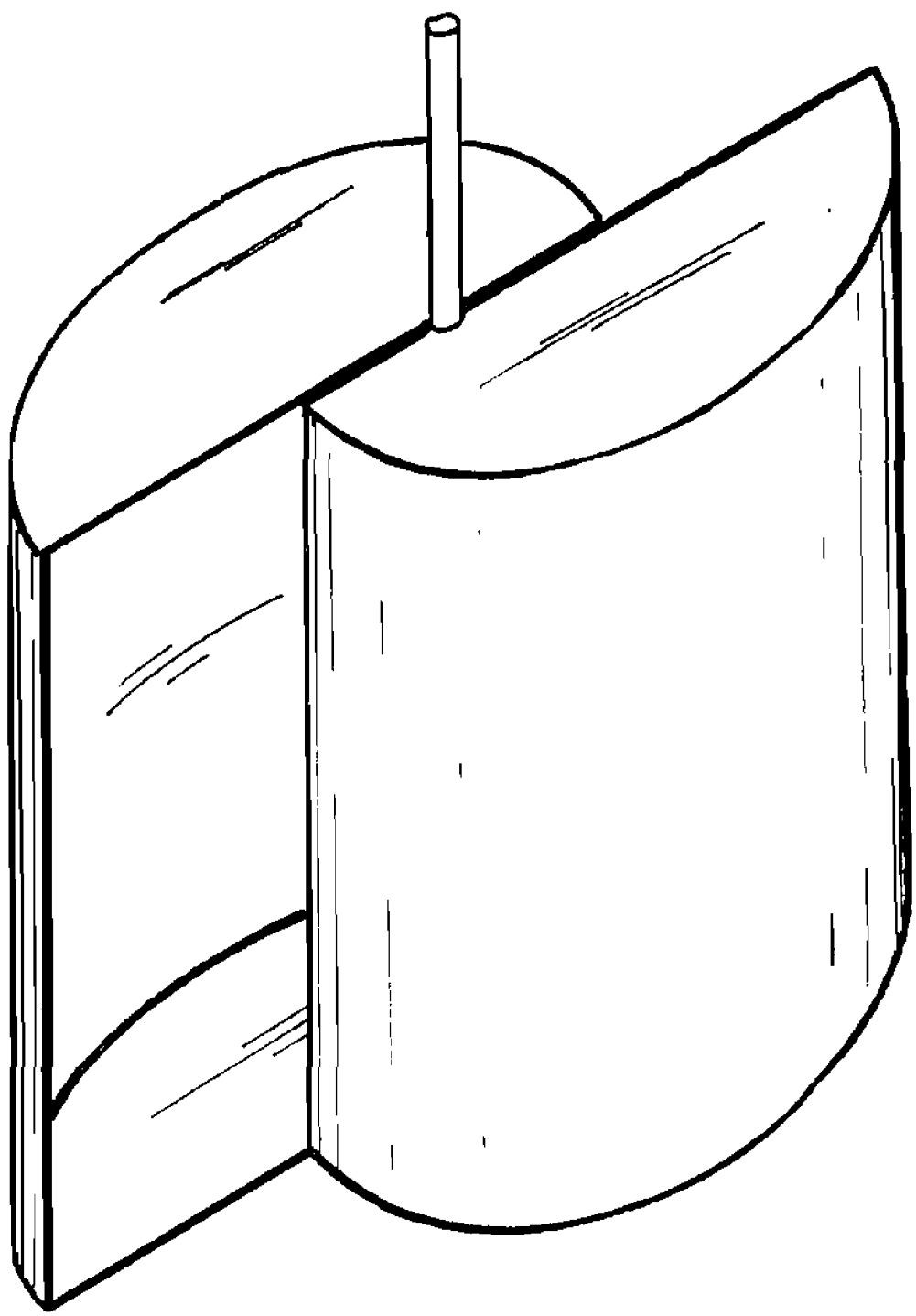
FIG. 10 is a schematic illustration of a traditional Savonius type rotor.

Savonius rotors or turbines are a relatively simple form of wind turbine, and have historically been employed as vertical axis wind turbines. In their traditional form, Savonius rotors are composed of two or sometimes three half-cylinders or scoops, as illustrated in FIG. 10. Savonius rotors are drag-type devices. Because of the curvature of the cylinders, they experience less drag when moving against the wind than when moving with the wind. This differential in drag a causes a Savonius rotor to spin. In the pursuit of larger and larger systems for utility power generation, the Savonius rotor has been disregarded, in part, due to the fact that the traditional Savonius design is much less efficient than a blade based design at high wind speeds in clear air.

Figure 4:
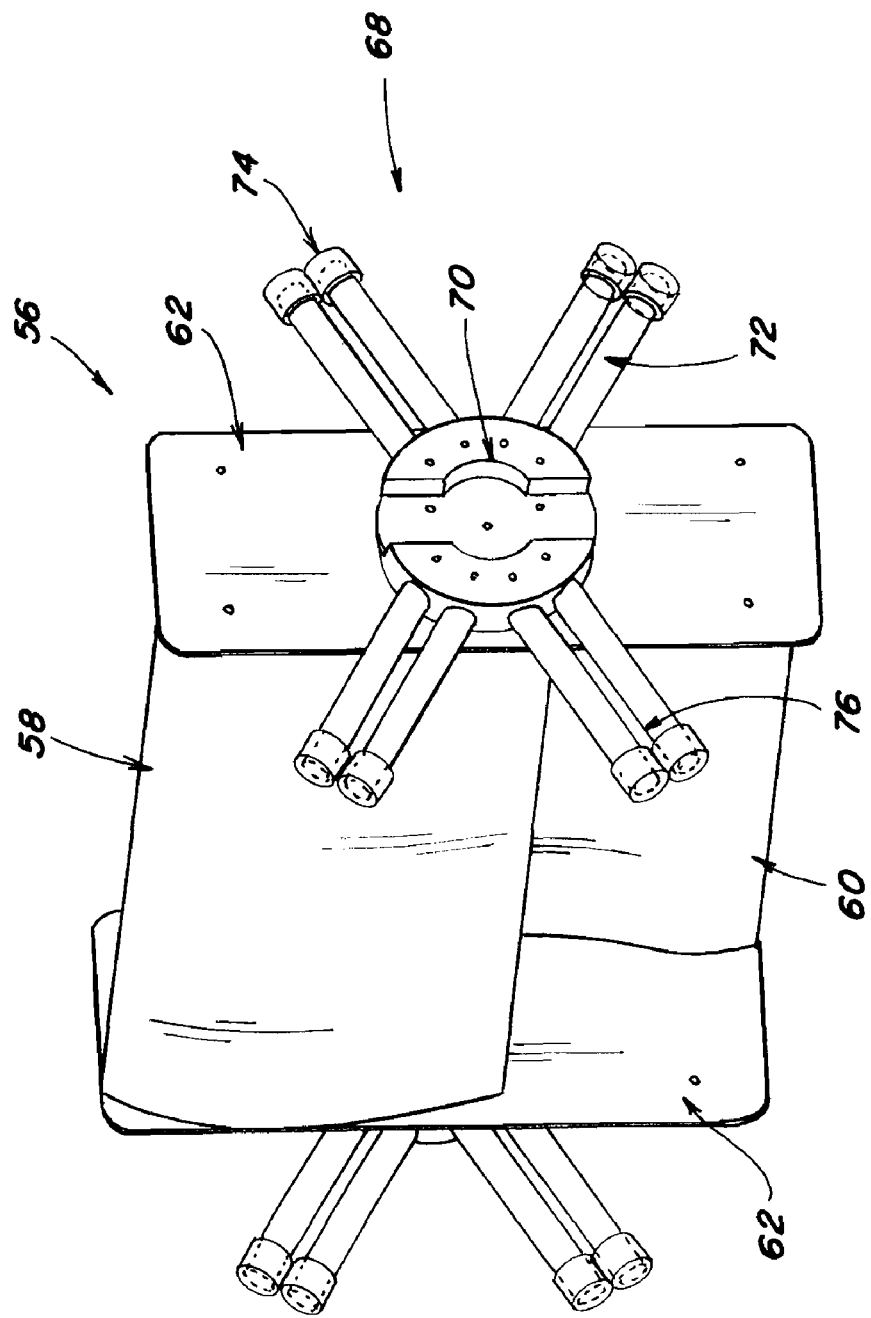
FIG. 4 is a perspective view of a rotor for use in a fluid-driven power generation system according to yet another embodiment.
Figure 5A:
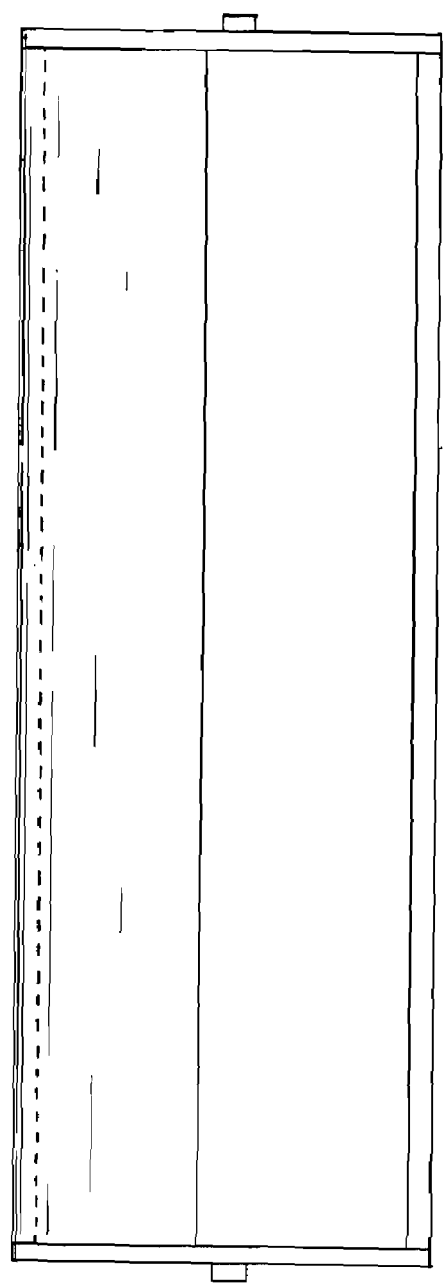
FIG. 5A is front view of a rotor for use in a fluid-driven power generation system according to another embodiment.
Figure 5B:
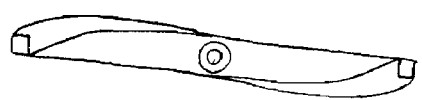
FIG. 5B is side view of a rotor for use in a fluid-driven power generation system according to another embodiment.

An alternative to the standard Savonius rotor design is what is sometimes referred to as an aero-hybrid Savonius rotor. Both the traditional Savonius rotor design and the aero-hybrid Savonius rotor design are suitable for use in the presently disclosed system. The construction of the rotor 56 is illustrated in FIGS. 4, 5, and 7. The rotor 56 includes first 58 and second 60 elongated blades. The blades 58, 60 are mounted within a pair of end plates 62, which support and maintain the blades relative to one another. Each blade has a profile that transitions from a thicker, curved portion at the outer, radial edge of the blade to a thinner, generally flat portion toward the axis of the rotor. In this manner, each blade is shaped similarly to an airfoil. Neither blade actually intersects the axis of the rotor. Rather the interior edges of the blades are separated by an open channel running the length of the rotor, which contributes to the operation of the rotor as explained in detail below. Bearings 64 are attached to the end plates 62 at the axis of rotation to facilitate connection of the rotor 56 to the frame 54.

Figure 6:
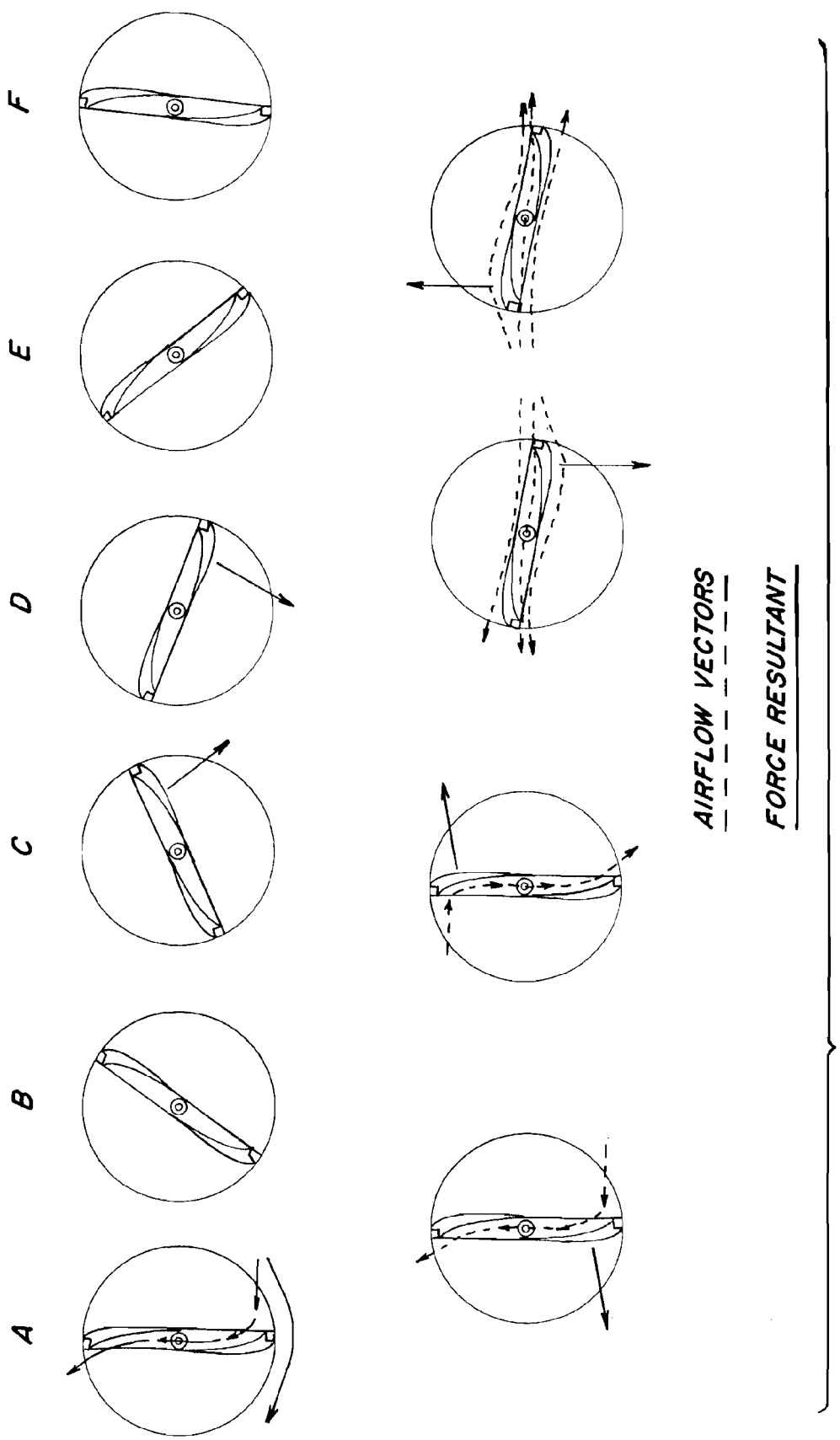
FIG. 6 is step-by-step illustration of the rotational operation of a rotor for use in a fluid-driven power generation system according to another embodiment.

While the operating principles of aero-hybrid Savonius type rotors are well known to those of skill in the art, the general aerodynamic operation of a rotor 56 in a horizontal orientation is illustrated in a step-by-step fashion in FIG. 6 for the sake of clarity. When the radial edge of the first blade 58 is in its lowest position, wind rushes up the inside of the blade 58 and through the channel separating the first and second blades. The air flow then impacts the inside of the second blade 60, as shown in panel A of FIG. 6. The pressure created by the air flow impacting the inside of the first blade 58, in combination with air flow impacting the inside, or backside, of the second blade 60 initiates rotation of the rotor 56. Advantageously, the arrangement of the blades lowers the required wind velocity for the initiation of rotation to 3 mph. As the blades rotate the second blade 60 tips into the free air stream (as shown in panel B of FIG. 6), at which point the rotor transitions from pressure-based operation to aerodynamic lift operation (panel C). The profile of the second blade 60, in combination with the long flat section of the first blade 58 and the channel between the blades, transforms into an airfoil with a slotted flap and increases lift (panel D). The aerodynamic lift on the blades reaches a maximum when the blades are in a horizontal position. The aerodynamic lift carries the rotor 56 through horizontal until it begins to stall (panel E). At this point, the second blade 60 is now positioned with its radial edge pointing downward as the first blade 58 was at the beginning of the cycle (panel F). Thus, the blades transition back to pressure-based operation, and the cycle restarts.

FIG. 4 illustrates an enhancement to the basic structure and operation of the rotor 56. Under certain conditions there exists a region in the rotation of the rotor 56 where negative torque, i.e., torque operating in direction against the intended rotation of the rotor, occurs due to the coefficient of moment of the airfoil. This negative torque region can interfere with the initiation of rotation, particularly in low wind velocity conditions. A starter mechanism 68 is incorporated at one or both ends of the rotor 56 to provide additional rotational momentum to the rotor 56 and ensure proper initiation of rotation. The starter mechanism 68 includes a hub 70 connected to the end plate 62 of the rotor 56. A plurality of elongated, hollow structures or tubes 72 are rigidly attached to the hub 70. These tubes 72 are oriented perpendicularly to the axis of rotation of the rotor 56 and extend outward from the hub 70. Each tube 72 is closed at both ends. In the embodiment shown, the outer ends of each tube 72 are closed with an end cap 74. A free-moving weight 76 is sealed within each tube 72. In a preferred embodiment, the weight 76 is spherical to enhance its movement within the tube 72. In the illustrated embodiment, each starter mechanism 68 is provided with four pairs of tubes 72. Each pair of tubes is oriented at an angle of approximately 60° to the nearest blade. Alternate tube arrangements may be used. In operation, the weight 76 within the lower tube on the inside of the lower blade rolls downhill toward the outer end of the tube 72 as the lower blade begins to rotate. This movement of the weight 76 introduces additional torque to the rotor 56 at the beginning of rotation to push the rotor through the region of negative torque. As the rotor comes up to speed, the weights 76 in each of the tubes 72 are forced to the outer ends of the tubes.

Advantageously, the fixed magnet arrays 66 used for electrical power generation are incorporated into the blades themselves. As illustrated in FIGS. 5 and 7, in one embodiment the magnet arrays are secured to the radial edges of the blades 58, 60. Alternately, the magnet arrays may be secured to the axial edges or end plates of the blades. This arrangement eliminates the generator and the coupling used in the prior and allows the system to utilize only one moving part: the rotor. The rotor becomes a generator rotor. The stator or armature coils 78 for the generator are attached to the frame 54. In a roof mounted, horizontal arrangement, the armature coil can be positioned along the peak of the roof. As the blades 58, 60 pass by the coil 78, the magnetic field generated by the magnet array 66 passes through the coil 78, and the coil 78 produces an electric current. The load on the coil produces what is measure as voltage in the system.

Figure 11:
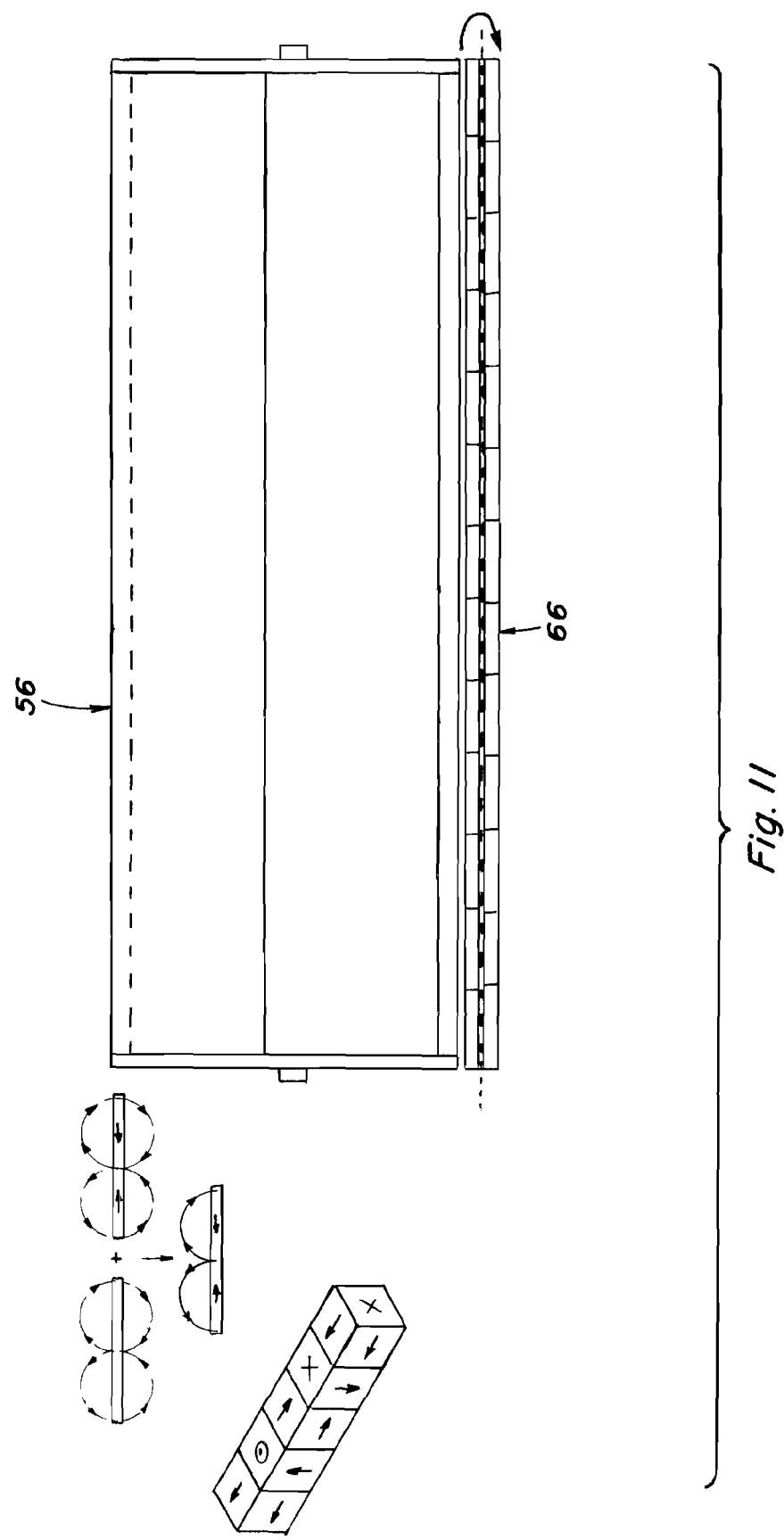
FIG. 11 is a schematic illustration of a rotor for a fluid-driven power generation system utilizing a Halbach array.

To further increase the power output of the machine, the magnets can be arranged as a Halbach array. A Halbach array is a special arrangement of permanent magnets which augments the magnetic field on one side of the device while cancelling the field to near zero on the other side. Hallbach arrays are found in refrigerator magnets and are the reason why a refrigerator magnet "sticks" on one side and falls off on the other. Hallbach's arrangement cancels the magnetic field on the back side of the array and strengthens the field on the front side by 40%. This allows a machine to produce more energy for the same investment in permanent magnets. While advantageous, the Halbach array causes one disadvantage. The flux lines of the magnetic field are opposed to each other, which creates current field in the coil that try to force electrons in opposition to one another. (See panel A of FIG. 11) The normal solution to this would be a commutator—a set of mechanical brushes that change the polarity of the connection as the magnets pass. This would cause additional losses, however. The solution to this is to have a woven fabric of wires that pass in and out of the flux so that each pass of the magnets produces current in a single direction. The current in the red path would flow left to right, while the blue path flows right to left. The two paths pass in and out of the flux field's magnetic permeability limit to avoid conflicting current flow. Optionally, the two paths may be one path by connecting the red to the blue path as shown by the arrow on the right side.

Figure 8:
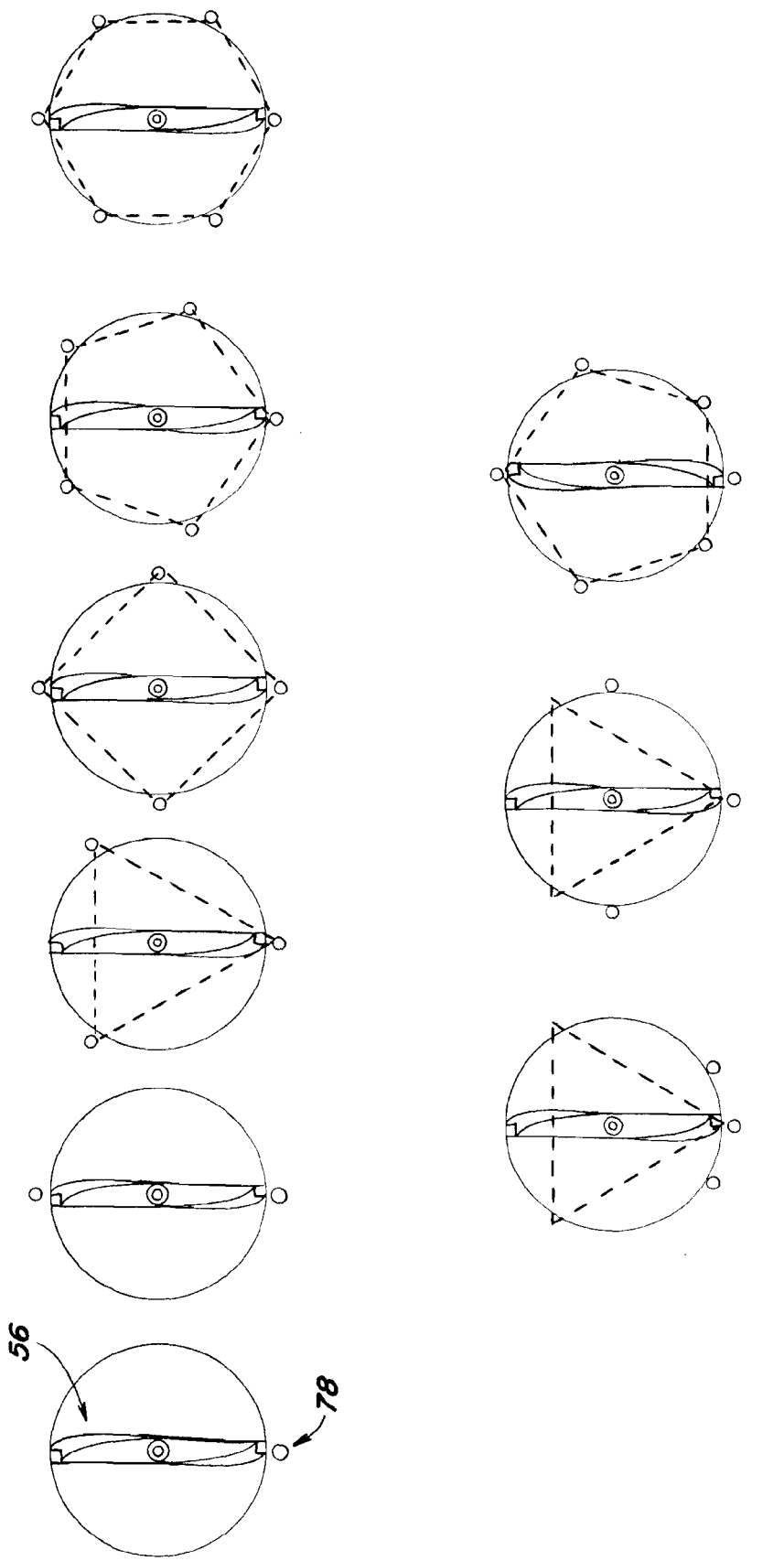
FIG. 8 is schematic illustration of a number of armature coil configurations for use in a fluid-driven power generation system.

Multiple armature coils 78 may be used in the system. FIG. 8 illustrates a variety of potential armature configurations around the generally circular path of rotation defined by the radial edges of the blades 58, 60. The configurations shown in the upper row of FIG. 8 use armature coils 78 positioned at uniform angles around the path of rotation. Advantageously, the one and two coil configurations cause the least interference with the aerodynamics of the rotor 56. In the case of a six coil configuration, a slat 88 can be incorporated into the coil shape to direct air flow in an aerodynamically beneficial manner during the transition period when the rotor moves from pressure-based operation to aerodynamic lift-based operation. The coil placement could be made to be a benefit aerodynamically by using a shape around the coil to act as a slat when the rotor transitions from pressure-based operation to aerodynamic lift-based operation. This arrangement increases the stall angle of the airfoil and generates more lift during the weakest part of the rotation. A similar arrangement may be accomplished with a four coil setup.

Multiple coil configurations do not all have be in circuit with the load at the same time. Coils can be brought on line as the rotation speed reaches key values. A free frequency counter and RPM gage are obtainable from the coil actuation, and, based on that frequency, it is possible to switch in additional coils to get the most energy out of light wind speeds. It is not essential to the invention that the coils 78 be symmetrical about the path of rotation. The lower row of configurations in FIG. 8 is illustrative.

Figure 9:
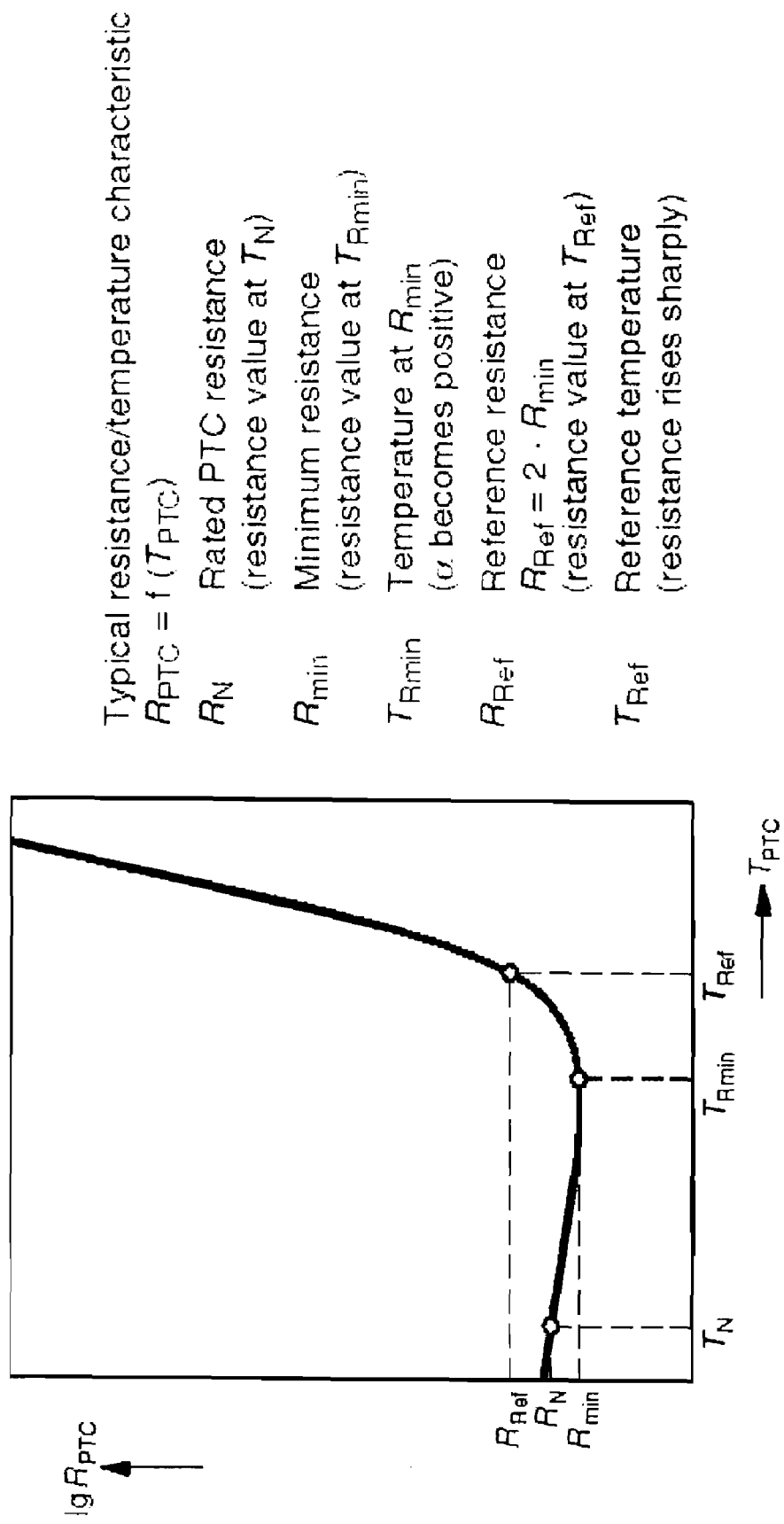
FIG. 9 is a chart of the surface temperature vs. resistance profile of a positive thermal coefficient heater element for use in a fluid-driven power generation system.

The modular system of the present invention is advantageously suited to building heating applications. Heating applications don't require the precise voltage and frequency control devices that computers and televisions require. One challenge is to regulate the heat production based on the demand from the house. Normally this would be accomplished by using a sophisticated thermostat, like those found on heat pumps, to switch between available heat sources. Some applications (like a home) might need such a device while heating a space like a garage or farm building would not. The present system utilizes a self-regulation heating element 80, specifically, a positive thermal coefficient (PTC) heater element, connected with the rotor/generator assembly, resulting in an extremely compact and efficient system. These devices are self regulating, in that the electrical resistance they cause in the system is inversely proportional to the system's ability to accept heat. The more heat that is needed, the lower the resistance and the faster the rotor/generator unit turns to provide the needed power. The less heat that is needed, the higher the resistance and the slower the rooftop unit turns—or it can stop almost completely. FIG. 9 provides a chart of the surface temperature vs. resistance profile of a positive thermal coefficient heater element.

In some applications it may be advantageous to integrate the above described system with a building's existing furnace-based heating system. In such cases, the system adds a furnace intercept controller. The furnace intercept controller receives a command for heat from the building's thermostat and determines the most efficient manner to provide the required amount of heat. Based on this determination, the furnace intercept controller can engage the fluid-driven system, the furnace, or both units.

Of course, it is also possible to incorporate the rotor/generator assembly described herein into an electrical generating system. In such a system, the additional components required would include a charge regulator 82, battery 84, and inverter 86, as described in connection with prior art systems.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

I claim:

1. A fluid-driven power generation system, comprising:
    a frame;
    a rotor structure, said rotor structure having an axis of rotation;
    said rotor structure comprising a plurality of blades, each of said blades having a radial edge parallel to said axis of rotation and first and second axial ends perpendicular to said axis of rotation, wherein said radial edges of said blades define a path of rotation when said blades rotate;
    at least one magnet integral with at least one of said blades; and
    a first armature coil adjacent to said path of rotation, wherein said rotor structure comprises a Savonius type rotor having first and second blades; and further comprising a self-regulating heating element in electrical communication with said armature coil.

2. The fluid-driven power generation system as set forth in claim 1, further comprising a building roof structure supporting said frame and wherein said axis of rotation of said rotor structure is parallel to a plane of said roof structure.

3. The fluid-driven power generation system as set forth in claim 2, wherein said roof structure comprises at least one plane angled relative to horizontal, said frame being arranged at an upper end of said roof structure.

4. The fluid-driven power generation system as set forth in claim 2, further comprising a building roof structure having a peak, said frame being arranged at said peak.

5. The fluid-driven power generation system as set forth in claim 1, wherein said axis of rotation is vertically oriented.

6. The fluid-driven power generation system as set forth in claim 1, wherein said magnet is integral with said radial edge of one of said blades.

7. The fluid-driven power generation system as set forth in claim 1, wherein said magnet is integral with one of said first and second axial ends of one of said blades.

8. The fluid-driven power generation system as set forth in claim 1, further comprising at least a second armature coil adjacent to said path of rotation and spaced from said first armature coil.

9. The fluid-driven power generation system as set forth in claim 8, wherein said second armature coil is spaced approximately 180° from said first armature coil on said path of rotation.

10. The fluid-driven power generation system as set forth in claim 1, wherein said self-regulating heating element is a positive thermal coefficient heater element.

11. The fluid-driven power generation system as set forth in claim 1, wherein said first magnet comprises a Halbach array.

12. The fluid-driven power generation system as set forth in claim 1, further comprising at least a first starter mechanism connected with one of said axial ends of said blades, said starter mechanism comprising:
    a hub;
    a plurality of hollow, elongated structures spaced around and extending away from said hub perpendicularly to said axis of rotation, said hollow, elongated structures being closed at each end thereof; and
    a free-moving weight within each of said hollow, elongated structures, said free-moving weights moving away from said axis of rotation within said hollow, elongated structures in response to rotation of said rotor structure.

13. The fluid-driven power generation system as set forth in claim 12, further comprising a second starting mechanism arranged at an opposite axial end of said blades from said first starting mechanism.

14. The fluid-driven power generation system as set forth in claim 1, wherein said Savonius type rotor is an aero-hybrid Savonius rotor.

15. A fluid-driven power generation system, comprising:
    a frame;
    a Savonius type rotor rotatably mounted on said frame and comprising a pair of blades disposed for symmetrical rotation about a horizontal axis, each of said blades having a radial edge parallel to said axis of rotation and first and second axial ends perpendicular to said axis of rotation, and wherein said radial edge of said blades define a generally circular path of rotation when said rotor is in motion;
    at least one magnet integral with at least one of said blades;
    a first armature coil arranged at a point adjacent to said path of rotation; and
    a self-regulating heating element in electrical communication with said armature coil.

16. The fluid-driven power generation system as set forth in claim 15, further comprising at least a second armature coil adjacent to said path of rotation and spaced from said first armature coil.

17. The fluid-driven power generation system as set forth in claim 15, further comprising a building roof structure supporting said frame, said roof structure comprising at least one plane angled relative to horizontal, said frame being arranged at an upper end of said roof structure.

18. The fluid-driven power generation system as set forth in claim 15, wherein said magnet is integral with said radial edge of one of said blades.

19. The fluid-driven power generation system as set forth in claim 15, wherein said magnet is integral with one of said first and second axial ends of one of said blades.

20. The fluid-driven power generation system as set forth in claim 15, further comprising at least a first starter mechanism connected with one of said axial ends of said blades, said starter mechanism comprising:
    a hub;
    a plurality of hollow, elongated structures spaced around and extending away from said hub perpendicularly to said axis of rotation, said hollow, elongated structures being closed at each end thereof; and
    a free-moving weight within each of said hollow, elongated structures, said free-moving weights moving away from said axis of rotation within said hollow, elongated structures in response to rotation of said rotor structure.

21. The fluid-driven power generation system as set forth in claim 15, further comprising:
    a charge regulator in electrical communication with said armature coil;
    a battery in electrical communication said charge regulator; and
    an inverter in electrical communication with said battery.

22. The fluid-driven power generation system as set forth in claim 15, wherein said Savonius type rotor is an aero-hybrid Savonius rotor.

* * * * *